United States Patent [19]
Lange et al.

[11] Patent Number: 5,966,240
[45] Date of Patent: Oct. 12, 1999

[54] LASER BLOCKING FILTER WITH NEUTRAL TRANSMISSION COLOR

[75] Inventors: Mark H. Lange, Applegate; Charles K. Langhorn, Meadow Vista; Dennis G. Fischer, Auburn; Bruce E. Perilloux, Grass Valley, all of Calif.

[73] Assignee: Coherent, Inc., Santa Clara, Calif.

[21] Appl. No.: 08/976,200

[22] Filed: Nov. 21, 1997

[51] Int. Cl.$^6$ ............................................... G02B 5/28
[52] U.S. Cl. ........................... 359/583; 359/589; 359/590
[58] Field of Search ................................. 359/580, 583, 359/584, 585, 586, 588, 589, 590, 629, 630, 634

[56] References Cited

U.S. PATENT DOCUMENTS

| | | | |
|---|---|---|---|
| Re. 33,729 | 10/1991 | Perilloux | 359/359 |
| 3,947,092 | 3/1976 | Flad | 359/589 |
| 4,601,533 | 7/1986 | Moss | 359/24 |
| 4,655,540 | 4/1987 | Wood et al. | 359/13 |
| 4,896,928 | 1/1990 | Perilloux et al. | 350/1.6 |
| 5,035,485 | 7/1991 | Kageyama | 359/586 |
| 5,194,989 | 3/1993 | Ferrante et al. | 359/583 |
| 5,238,738 | 8/1993 | Miller | 359/359 |
| 5,576,886 | 11/1996 | Ferrante | 359/629 |

*Primary Examiner*—Jon Henry
*Attorney, Agent, or Firm*—Limbach & Limbach L.L.P.

[57] ABSTRACT

A filter system for reflectively blocking laser radiation in the visible spectrum includes a multilayer interference structure arranged for reflectively blocking a continuous band of wavelengths including the laser radiation and transmitting other wavelengths in the visible spectrum. The filter system is arranged to control transmission of the other wavelengths of the visible spectrum such that the filter system has an essentially neutral transmission color and maximum photopic transmission consistent with the band of wavelengths reflectively blocked.

11 Claims, 6 Drawing Sheets

TABLE 1

| \# | FILTER 30 41° INCIDENCE QWOT | \# | QWOT |
|---|---|---|---|
| 1 | 1.1411 | 38 | 0.5212 |
| 2 | 1.3578 | 39 | 0.8877 |
| 3 | 0.3132 | 40 | 1.2331 |
| 4 | 0.4312 | 41 | 0.8181 |
| 5 | 1.1355 | 42 | 0.6797 |
| 6 | 1.0588 | 43 | 0.6288 |
| 7 | 1.0765 | 44 | 0.9569 |
| 8 | 0.2789 | 45 | 1.0193 |
| 9 | 0.6719 | 46 | 0.7825 |
| 10 | 1.2536 | 47 | 0.7650 |
| 11 | 0.9374 | 48 | 1.2630 |
| 12 | 0.8873 | 49 | 0.8743 |
| 13 | 0.1486 | 50 | 0.6094 |
| 14 | 1.0839 | 51 | 0.6261 |
| 15 | 1.1327 | 52 | 0.9491 |
| 16 | 0.9184 | 53 | 1.0005 |
| 17 | 0.4638 | 54 | 0.8762 |
| 18 | 0.9369 | 55 | 0.5378 |
| 19 | 1.0737 | 56 | 0.9630 |
| 20 | 0.8535 | 57 | 1.1286 |
| 21 | 0.7220 | 58 | 0.8523 |
| 22 | 0.7195 | 59 | 0.6305 |
| 23 | 1.1303 | 60 | 0.8565 |
| 24 | 1.1107 | 61 | 1.0098 |
| 25 | 0.3191 | 62 | 0.9215 |
| 26 | 0.7320 | 63 | 0.6412 |
| 27 | 0.9543 | 64 | 0.8523 |
| 28 | 1.1513 | 65 | 0.9853 |
| 29 | 0.6925 | 66 | 0.9843 |
| 30 | 0.7217 | 67 | 0.6460 |
| 31 | 0.8300 | 68 | 0.9084 |
| 32 | 1.2041 | 69 | 0.9901 |
| 33 | 0.7265 | 70 | 0.9634 |
| 34 | 0.7645 | 71 | 0.7062 |
| 35 | 0.6785 | 72 | 0.9986 |
| 36 | 1.1323 | 73 | 0.8129 |
| 37 | 0.9594 | 74 | 0.4377 |

TABLE 2

| \# | FILTER 40 NORMAL INCIDENCE QWOT | \# | QWOT |
|---|---|---|---|
| 1 | 0.9890 | 38 | 0.6754 |
| 2 | 1.0372 | 39 | 0.6281 |
| 3 | 0.6631 | 40 | 0.6323 |
| 4 | 0.9281 | 41 | 0.9057 |
| 5 | 1.2008 | 42 | 0.8628 |
| 6 | 1.1616 | 43 | 0.7115 |
| 7 | 0.9760 | 44 | 0.6765 |
| 8 | 0.4514 | 45 | 0.6902 |
| 9 | 0.7844 | 46 | 0.9675 |
| 10 | 0.7358 | 47 | 0.8481 |
| 11 | 0.8865 | 48 | 0.5603 |
| 12 | 0.7987 | 49 | 0.6486 |
| 13 | 0.6721 | 50 | 0.7502 |
| 14 | 0.6578 | 51 | 0.8180 |
| 15 | 0.8229 | 52 | 0.9035 |
| 16 | 0.9160 | 53 | 0.6625 |
| 17 | 0.7134 | 54 | 0.6699 |
| 18 | 0.6320 | 55 | 0.6108 |
| 19 | 0.6784 | 56 | 0.9285 |
| 20 | 0.6556 | 57 | 0.8652 |
| 21 | 0.8572 | 58 | 0.5826 |
| 22 | 0.8633 | 59 | 0.8297 |
| 23 | 0.6620 | 60 | 0.5768 |
| 24 | 0.6485 | 61 | 0.8723 |
| 25 | 0.7979 | 62 | 1.0152 |
| 26 | 1.0290 | 63 | 0.5624 |
| 27 | 0.7715 | 64 | 0.5808 |
| 28 | 0.6552 | 65 | 0.9298 |
| 29 | 0.6558 | 66 | 0.8584 |
| 30 | 0.8416 | 67 | 1.0335 |
| 31 | 0.9155 | 68 | 0.4959 |
| 32 | 0.6245 | 69 | 0.1160 |
| 33 | 0.6416 | 70 | 0.6796 |
| 34 | 0.7223 | 71 | 0.9619 |
| 35 | 0.6379 | 72 | 0.7737 |
| 36 | 0.9516 | 73 | 0.9927 |
| 37 | 0.7886 | 74 | 0.1423 |

FIG. 6

LASER BLOCKING FILTER WITH NEUTRAL TRANSMISSION COLOR

BACKGROUND OF THE INVENTION

The present invention relates to narrow-band, reflective, multilayer, interference filters for blocking (reflecting) passage of laser or near-monochromatic radiation having a wavelength in the visible portion of the electromagnetic spectrum (visible wavelength), while transmitting other visible wavelengths. The invention is related in particular to such a filter wherein layers thereof are arranged such that the transmission characteristic of the filter is color neutral.

Narrow-band, reflective, multilayer, interference filters are extensively used in many types of laser-based direct-vision optical systems for protecting the eyes of a user from damage by stray laser radiation. One particular type of laser-based system in which such filters are employed is a laser surgery system which delivers laser radiation to a surgical site on a patient for tissue ablation, incision, cautery, or the like, while permitting a surgeon operating the system to observe the site and its surroundings during the operation.

In order to permit maximum transmission through such a filter it must be designed to reflect over as narrow a bandwidth as possible. Because of this, the filter typically has more individual layers and is of much greater thickness than a multilayer laser-cavity reflector which has no other requirements than an ability to reflect a particular laser wavelength to a desired degree.

A particular problem with prior art visible-wavelength laser blocking filters is that their reflection bandwidth, while significantly narrower than a conventional highly reflecting multilayer laser reflector, still blocks visible light at longer and shorter wavelengths than the laser radiation wavelength. Because of this, light which is transmitted through such prior-art filters has a pronounced color. For example, a filter that blocks (green) laser radiation having a wavelength about 530 nanometers (nm) will have a pronounced magenta color. For a surgeon using a laser-surgery system including such a filter, a pronounced transmission color can provide difficulty in properly assessing conditions in a surgical site being treated. Additionally, prior-art reflective-laser blocking filters often have a relatively-low photopic transmission, for example, less than about fifty percent, as a result of too great a reflection bandwidth. This can further complicate assessment of treatment conditions.

SUMMARY OF THE INVENTION

In one aspect the present invention is directed to providing a filter system for reflectively blocking laser-radiation having a wavelength in the visible portion of the electromagnetic spectrum, and transmitting other wavelengths in the visible portion of the electromagnetic spectrum. Transmission of the other wavelengths is controlled in a manner which will cause the filter to have an essentially neutral transmission color, while maximizing photopic transmission of the filter.

In another aspect of a filter system in accordance with the present invention, the filter system includes a plurality of layers deposited on at least one transparent substrate. The plurality of layers includes a sequence of layers of alternately high and low refractive index transparent dielectric materials. The visible portion of the electromagnetic spectrum is characterized as having red, green, and blue primary-color wavelength-regions. The number of layers in said plurality of layers and the thickness of individual layers in the plurality of layers is selected such that a continuous band of wavelengths including the bandwidth of the laser radiation is reflectively blocked. The width of the continuous band of reflectively blocked wavelengths is sufficiently narrow that at least a portion of each of the red, green, and blue primary-color wavelength-regions is transmitted. Transmission of the portions of the red, green, and blue primary-color wavelength-regions is arranged such that light transmitted through the filter system has an essentially neutral transmission color and the photopic transmission of the filter is maximized.

In one preferred embodiment of a multilayer interference filter in accordance with the present invention, the reflectively-blocked band of wavelengths is in at least the green primary-color wavelength-region of the visible spectrum and includes the wavelength of the laser radiation. The thickness of individual layers in the plurality of layers is further selected such that transmission in the red and blue primary-color wavelength-regions, starting at a predetermined characteristic wavelength in each thereof, progressively decreases with respectively increasing and decreasing wavelengths.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

FIG. 6 contains two tables of layers wherein TABLE 1 corresponds to the layer arrangement of the filter of FIG. 3 and TABLE 2 corresponds to the layer arrangement of the filter of FIG. 4.

DETAILED DESCRIPTION OF THE INVENTION

Figure 1:
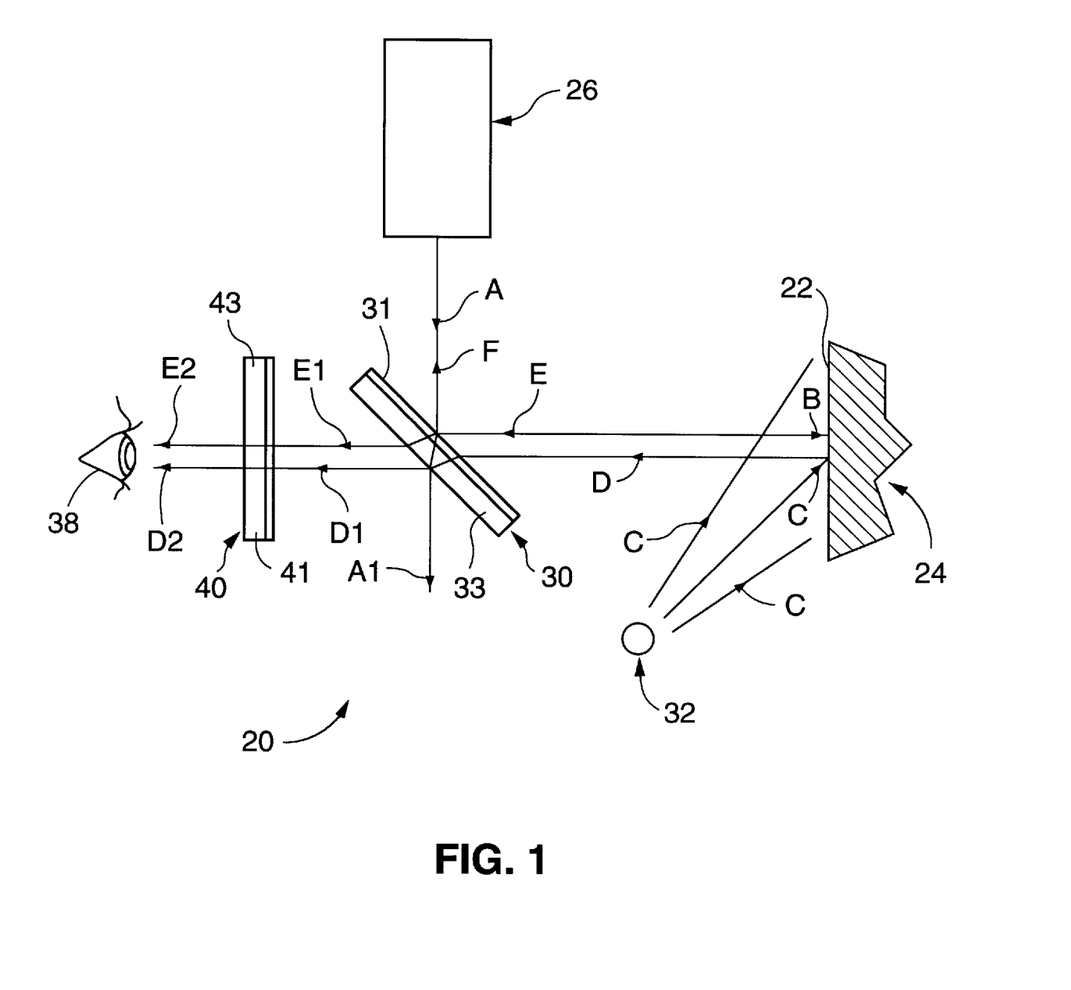
FIG. 1 is an elevation view schematically illustrating a laser illumination system including a blocking filter system in accordance with the present invention including first and second filters for protecting the eye of an operator of the system from radiation from the illuminating laser.

Turning now to the drawings wherein like components are designated by like reference numerals, FIG. 1 illustrates a simple form of laser illuminating system 20. The system is designed to illuminate a surface 22 of an object 24, for example for inscribing or ablating the surface of the object. A laser apparatus 26 projects, along a path indicated by arrow A, laser radiation at a wavelength $\lambda_W$ which is the working laser-light wavelength for ablating or inscribing, and also projects, along the same path, laser radiation at a wavelength $\lambda_A$ which is used for aligning the apparatus such that working laser radiation is delivered to a desired location on surface 22. Typically alignment laser light is delivered at orders of magnitude lower intensity than working laser light and can be switched off once system 20 has been aligned.

Working laser-light and alignment laser light travelling on path A is directed toward surface 22, as indicated by arrow B. by a first filter 30 in accordance with the present invention, including a stack 31 of laser-light (and visible light) transparent layers deposited on a transparent substrate 33. Filter 30 has a very high reflectivity, for example, greater than about ninety-nine percent (>99%) for wavelength $\lambda_W$, and has about 50% reflection and 50% transmission at alignment-laser wavelength $\lambda_A$. A portion of the alignment laser-light and a much smaller portion of working laser-light are transmitted by filter 30 as indicated by arrow A1. Surface 22 is also illuminated by a "white-light" source 32, such as an incandescent bulb, as indicated by arrows C. The term white-light here indicating that source 32 emits a continuous spectrum of radiation including wavelengths in the red, green, and blue primary-color regions of the visible portion of the electromagnetic spectrum.

Working laser-light and alignment laser-light, and white-light are diffusely reflected by surface 22 and at least a portion of all such diffusely-reflected light is directed toward filter 30 as indicated by arrows E and D respectively. Again, filter 30 reflects most of the working laser-light and 50% on the alignment laser-light incident thereon back towards laser 26 as indicated by arrow F. Filter 30 transmits a relatively small portion of working laser light and 50% of alignment laser-light incident thereon as illustrated by arrow E1. Filter 30 also transmits, as indicated by arrow D1, to some degree, those wavelengths of white-light which are not reflected, together with alignment and working laser-light by filter 30. Optionally, another filter 40, in accordance with the present invention is provided which is also highly reflective for working laser-light, but transmits, to some degree, toward operators eye 38, alignment laser-light, as indicated by arrow E2, and those remaining white light wavelengths transmitted by filter 30, as indicated by arrow D2. Filter 40 includes including a stack 41 of laser-light (and visible light) transparent layers deposited on a substrate 43.

While alignment laser-light and working laser-light is essentially monochromatic, it is not practically feasible to highly reflect, or even 50% reflect, only those monochromatic wavelengths. In each case, a continuous band of wavelengths including the particular laser-light wavelength must be reflected. Accordingly, those wavelengths of "white" light from source 32 which reach operator's eye 38 do not include any significant portion of a that band of wavelengths including the working laser-light wavelength $\lambda_W$ (the reflectively-blocked wavelength), and only about 50% of that band of wavelengths including the alignment laser-light wavelength $\lambda_A$. A result of this is that the operator would see a color-distorted image of surface 22, absent any measures to prevent this.

In accordance with the present invention, the number, thickness, and refractive indices of layers in stacks 31 and 41 are arranged such that the reflectively blocked bandwidth including $\lambda_W$ is sufficiently narrow that all or some part of each of the red, green, and blue primary-color regions of the visible spectrum is transmitted by filters 30 and 40 and further arranged such that those wavelengths from white-light source 32 which are transmitted through the filters, together form light having an essentially neutral color, thereby allowing a color-faithful image of surface 22 to be viewed by an operator of system 20. An essentially neutral color is defined generally here as a color with any dominant (visible-light) hue having a color-saturation of 10% or less.

The manner in which this is accomplished is described below in the context of a laser system, for example a surgical laser system, wherein working laser-light wavelength $\lambda_W$ is about 532 nanometers (nm) and alignment laser-light wavelength $\lambda_A$ is about 633 nm. Filter 30 is arranged at an oblique angle to light incident thereon. An object of the filters is to provide a combined optical density greater than 2.0 at $\lambda_W$, and a photopic transmission of essentially color-neutral light of greater than 60%.

Figure 2:
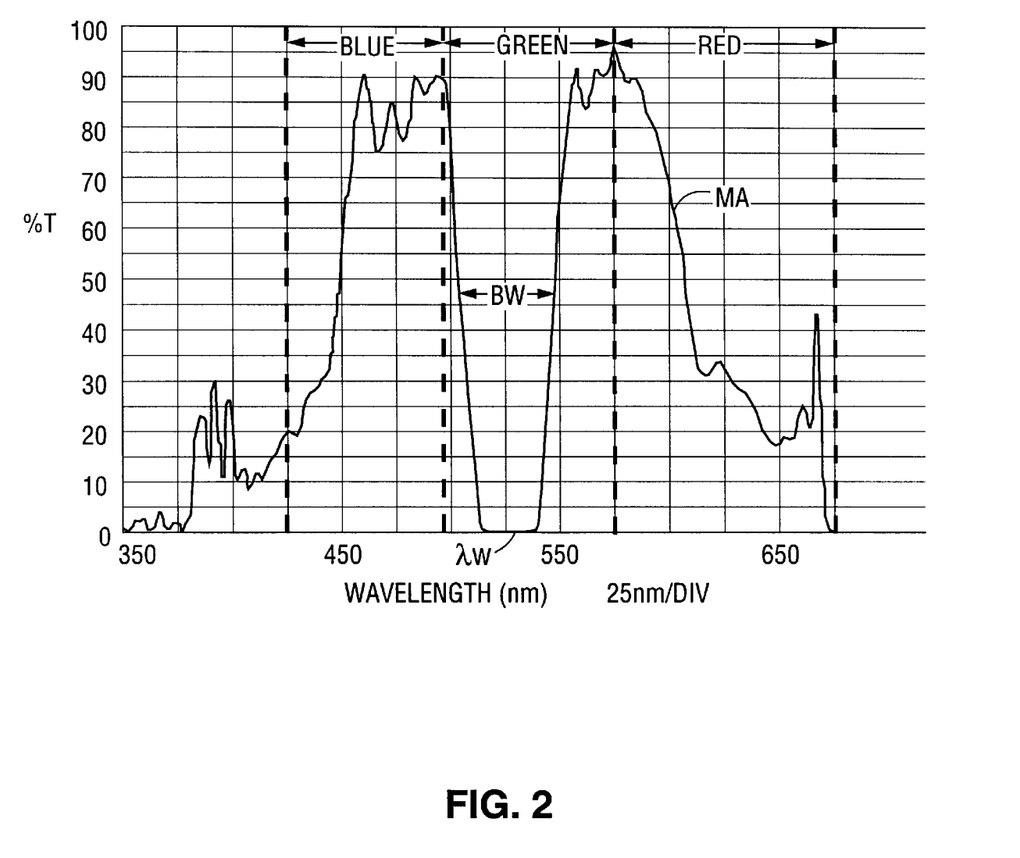
FIG. 2 is a graph schematically illustrating measured transmission as a function of wavelength for a combination of two filters exemplifying the first and second filters of FIG. 1.

Referring to FIG. 2, the measured transmission as a function of wavelength (curve MA) of a combination of two filters suitable for use as filters 30 and 40 of system 20 is illustrated. Indicated in FIG. 2 are the approximate locations of the red, green, and blue primary-color regions of the visible spectrum. A reflective-blocking region BW, having a bandwidth of about 40 nm and including working laser-light wavelength $\lambda_W$ occupies a portion of the green primary-color region. Maximum blocking is only available at one wavelength within this band. The transmission of the combination of filters is optimized such that wavelengths on the long and short sides of BW are maximally transmitted, in order to ensure the highest possible photopic transmission through the combination. The filters are further optimized such that transmission in the red and blue primary color-regions is reduced to color correct or compensate for color distortion which would otherwise result from transmission reduction in the green primary-color region, caused by blocking band BW. In order to maintain maximum possible photopic transmission and most effectively color compensate, transmission in the red and blue regions is progressively reduced with respectively increasing and decreasing wavelengths, beginning at wavelengths greater than about 580 nm and less than about 510 nanometers respectively. Curve MA of FIG. 2 has a photopic transmission of about 52% and a color saturation of about 4.9%. The filter combination has a minimum transmission of less than $1\times10^{-7}$ in blocking band BW.

It should be noted here that the terms "maximizing photopic transmission" and "maximum photopic transmission" as used in this specification and the appended claims refer to the maximum photopic transmission that can be achieved after a spectral region is reflectively blocked to reject a desired laser wavelength. Clearly, the maximum available photopic transmission will be greater the narrower the reflective-blocking band. Practical factors including the desired blocking level, angular acceptance requirements for the filter, and allowance for manufacturing tolerances may ultimately determine how narrow a blocking band can be.

It should also be noted that all spectral response data given herein is presented as transmission response, as in filters according to the present invention it is transmission, both photopic transmission and transmission in the blocking band, which is of particular importance. In filters of the type described herein, filter layers are formed from materials such a metal oxide materials, which have a very low absorption, i.e., are highly transparent, for visible light and of course the laser light which is also visible. Accordingly, reflectivity can be estimated or inferred from transmission data by simply subtracting the transmission from one (in decimal notation) or one-hundred (in percentage notation).

Figure 3:
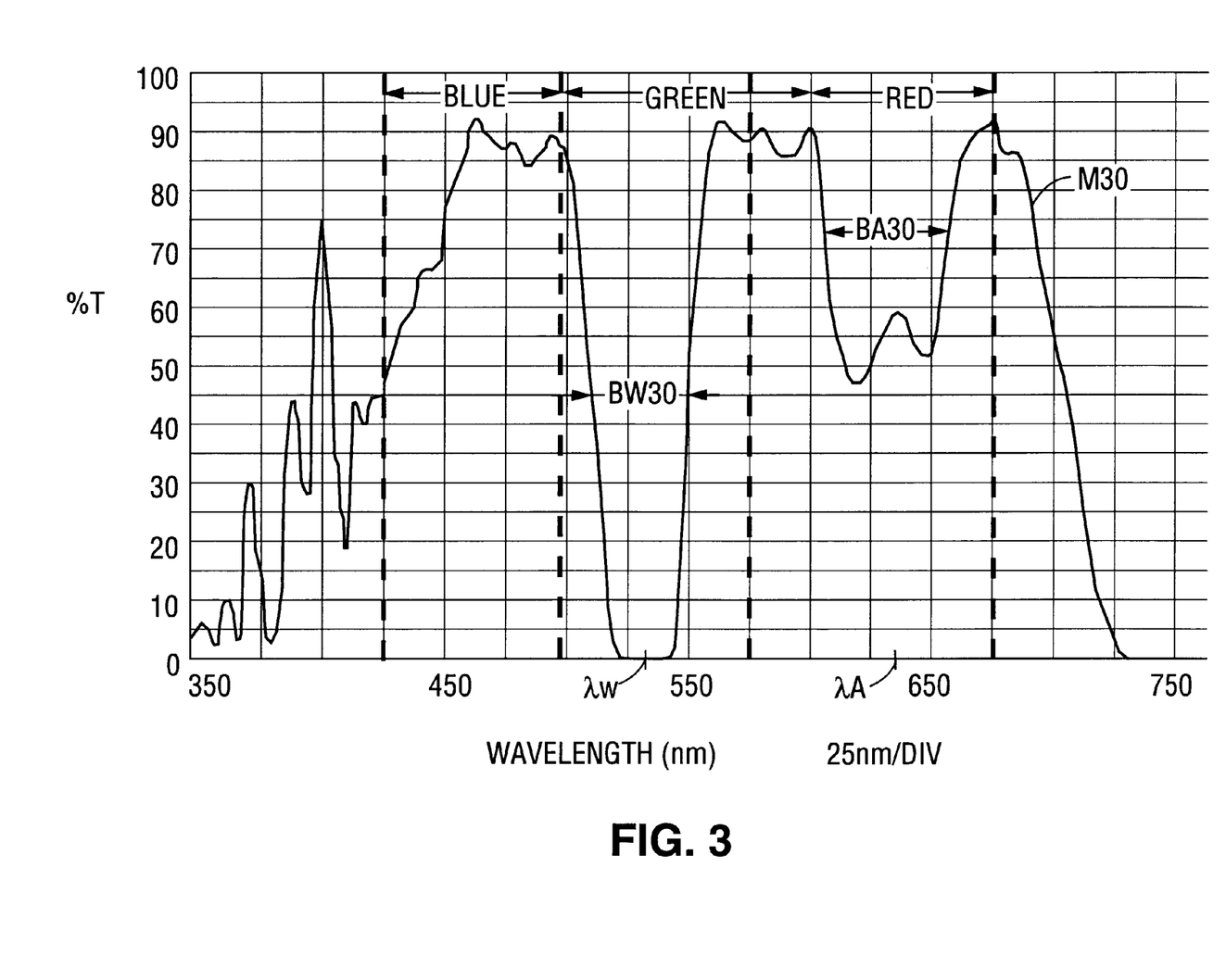
FIG. 3 is a graph schematically illustrating measured transmission as a function of wavelength for one of the two filters forming the combination of filters of FIG. 2.

Continuing now with a description of the exemplary filter system, in designing the filter combination, filter 30 was first designed. Layers of the filter were optimized to a target specification including a blocking bandwidth of about 40 nm with an optical density of 3 at $\lambda_W$; a reflectivity and transmission of about 50% at about 635 nm; and maximum transmission in all other visible wavelengths. No attention was paid to providing color-corrected transmission. FIG. 3 shows the measured transmission as a function of wavelength (curve M30) of the contribution of this filter to curve MA of FIG. 2. Curve M30 includes a blocking band BW 30 including $\lambda_W$ and an alignment band BA 30 including $\lambda_A$. The filter of FIG. 3 has a photopic transmission of about 56.5%; and a color saturation of about 21%.

The layer arrangement of the filter of FIG. 3 is shown as TABLE 1 in FIG. 6. In TABLE 1, odd-numbered layers are $HfO_2$ having a refractive index of 2.15 at a wavelength of about 520 nm. Even-numbered layers are assumed to be $SiO_2$ having a refractive index of about 1.48 at a wavelength of about 520 nm. Layers are numbered in consecutive numerical order beginning with the layer closest the substrate. The substrate is assumed to have a refractive index of about 1.51 at a wavelength of about 520 nm.

Figure 4:
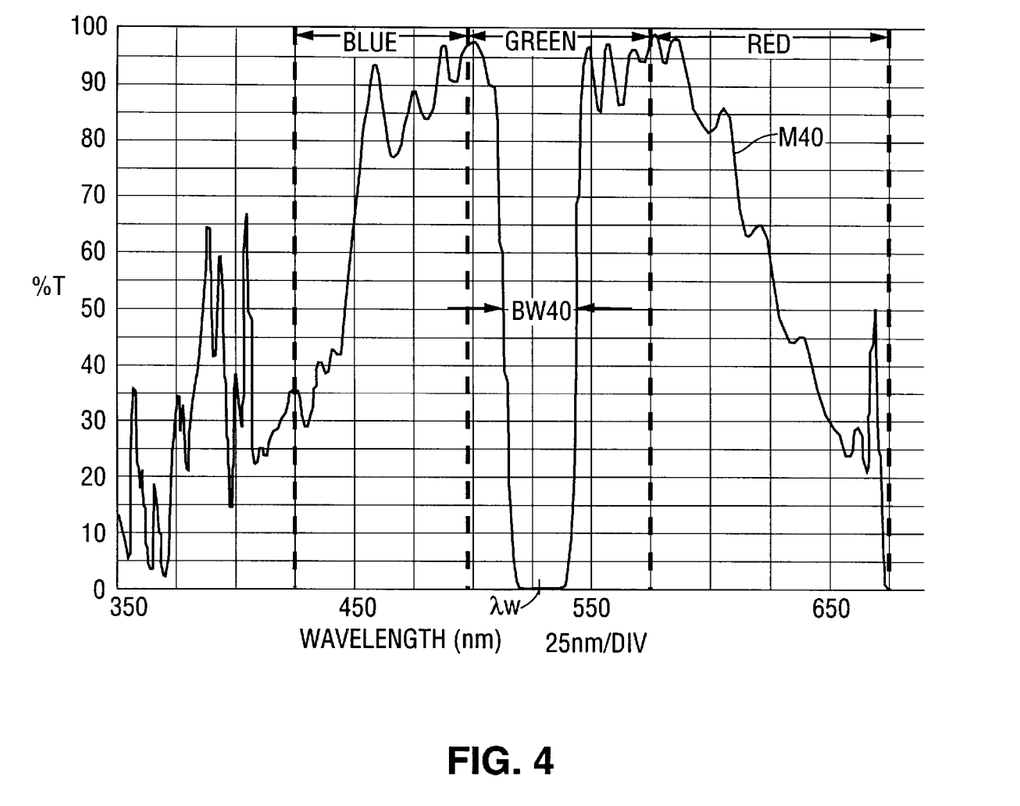
FIG. 4 is a graph schematically illustrating measured transmission as a function of wavelength for the other of the two filters forming the combination of filters of FIG. 2.

Next, filter 40 was designed. Layers of FIG. 4 were optimized to provide a blocking bandwidth of about 30 nm including $\lambda_W$, and to provide color corrected transmission when combined with filter 30 FIG. 4 shows the measured transmission as a function of wavelength (curve M40) of the contribution of this filter to curve MA of FIG. 2. Curve M40 includes a blocking band BW40 including $\lambda_W$. This filter alone has a photopic transmission of about 65%, and a color saturation of about 6.3%. As filter 40 has a narrower reflection band than filter 30, and this reflection band of filter 40, falls within the reflection band of filter 30, filter 40 does not introduce additional color distortion into the transmission of the system and can be designed as indicated to correct for the color distortion introduced by filter 30.

The layer arrangement of the filter of FIG. 4 is shown as TABLE 2 in FIG. 6. In TABLE 1, odd-numbered layers are $HfO_2$ having a refractive index of 2.15 at a wavelength of about 520 nm. Even-numbered layers are assumed to be $SiO_2$ having a refractive index of about 1.48 at a wavelength of about 520 nm. Layers are numbered in consecutive numerical order beginning with the layer closest the substrate. The substrate is assumed to have a refractive index of about 1.51 at a wavelength of about 520 nm.

It should be noted that in areas where progressive reduction of transmission is desired, this progressive reduction is not entirely smooth, but oscillates somewhat as a result of optical interference in the stack of layers forming the filter. This is exceedingly difficult to avoid in a filter having forty of more layers, but is insignificant as it is not perceptible by human vision. The terminology "progressive" as used in this description and the appended claims should thus be understood to imply a general trend of reduction rather than a smooth progression in the literal sense.

The above exemplified filters of the present invention are derived from a category of filters known as (reflective) notch-filters or trichroic filters. Basic layer arrangements for such filters are well known in the thin film design art. Any of such arrangements may be used as a starting layer sequence for optimization to provide a filter in accordance with the present invention. A preferred method of optimization is set forth below.

Optimization of a starting layer sequence proceeds by providing first target data to the optimizing program, the first target data specifying maximum reflectivity in region R of curve SD and maximum transmission in regions TS and TL on respectively short and long wavelength side of region R. A first optimization of the starting layer sequence is undertaken to match this target data.

Following this first optimization, a second optimization is formed, providing color correction, as required. Important here is to provide second target data specifying progressively reduced red and blue primary-color region transmission, with respectively increasing and decreasing wavelength as discussed above. Specifically it is important that reduction of red and blue transmission is made at wavelengths as close as possible to the respectively long and shortwave extremities. The reason for this is that while the visible spectrum can be arbitrarily divided into red green and blue primary color regions, the eye sensitivity curves for red, green and blue stimuli partially overlap. Accordingly reductions of transmission at wavelengths in the red and blue primary color regions at wavelengths in overlapping portions of these response curves, remote from the spectral extremes can only be made at the expense reducing green transmission, as perceived by the eye, and thus reducing photopic transmission.

It should be noted that while the filter system of the present invention has been described in terms of a configuration including layers deposited on two substrates, i.e., a system of two individual multilayers filters, the system is not limited to such a configuration. In cases where less laser blocking is required, it is possible to provide a color-corrected reflective blocking-filter by depositing layers on one substrate only. Correspondingly, if it is required that the system provide more laser blocking than exemplified above, it is possible to deposit layers on three or even more substrates, i.e, to provide a system of three or more individual multilayer blocking filters. It should also be noted that reduction of transmission for color-correction purposes may be accomplished by using a wavelength-selective absorbing glass or gelatin filter, for example, of the type used in photography. A wavelength-selective absorbing glass filter, of course, may be conveniently used as a substrate for a multilayer interference filter component of a filter system in accordance with the present invention.

Further, it should be noted that whereas the filter system of the present invention has been described in terms of having a reflective blocking bandwidth lying entirely in the green spectral region, and wherein red and blue transmission is reduced for color-correcting transmitted light, principles of the invention are applicable to other blocking band arrangements. These include, for example, filter systems having a blocking band lying entirely within the red or blue primary-color regions, and having color-correction provided by reduced transmission in respectively the green and blue, or green and red primary-color regions. These also include filter systems including reflective blocking bands which overlap either the red and green, or green and blue primary color regions. Where reduction of green region transmission is required for color correction, green region transmission it is best reduced in a wavelength region between about 510 and 530 nm, in order to maximize photopic transmission through the color neutral filter.

Figure 5:
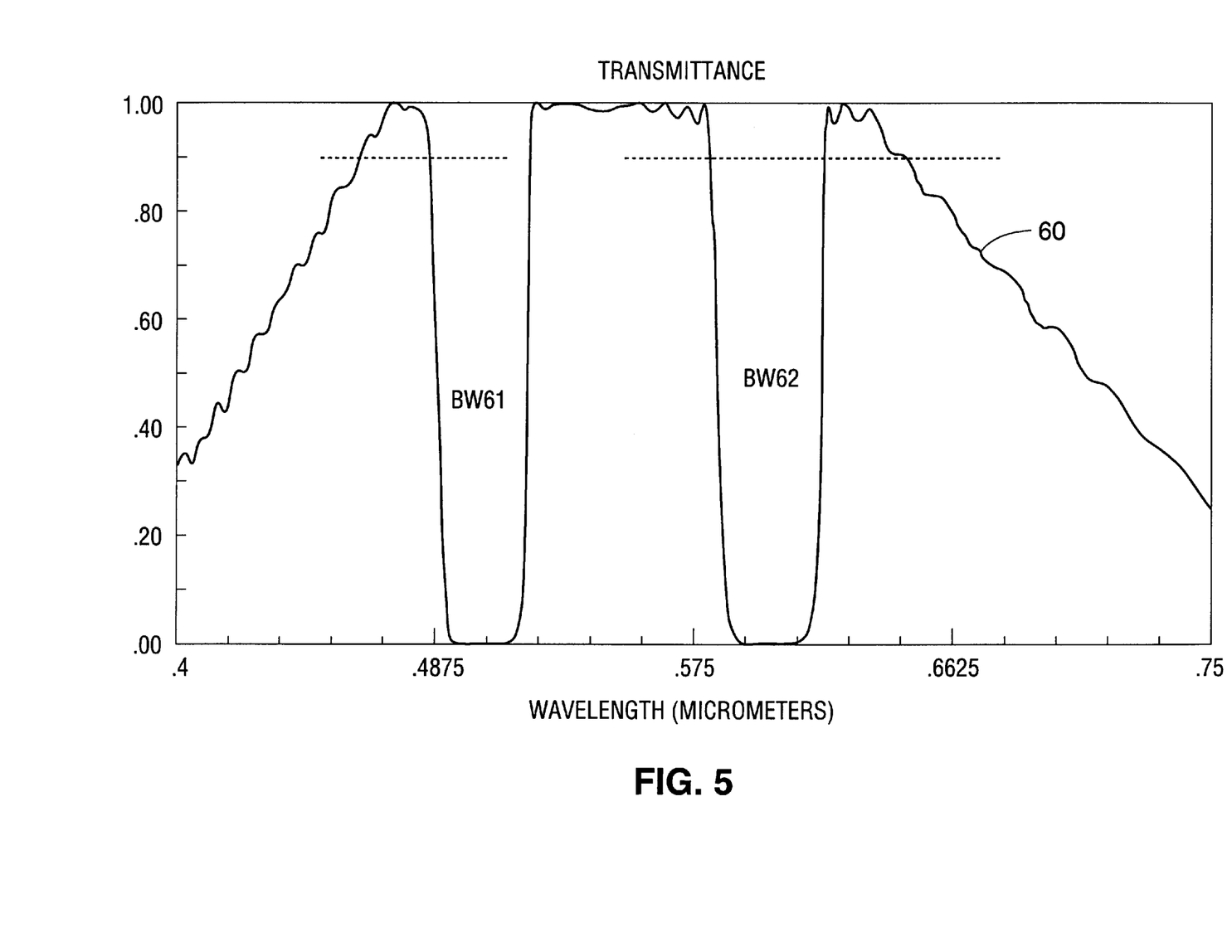
FIG. 5 is a graph schematically illustrating computed transmission as a function of wavelength for a color corrected filter in accordance with the present invention having two spaced-apart reflective blocking regions.

It is emphasized here that a filter system in accordance with the present invention is not limited to providing reflective blocking of a single wavelength or wavelength region, but may be used to reflectively block two or more wavelengths sufficiently spaced-apart in wavelength that two or more, separate, reflection blocking regions must be provided in order to provide reflection blocking while maintaining optimum photopic transmission following color-correction. Computed spectral response (curve 60) of a filter system having two reflective blocking regions (BW61 and BW62) is shown in FIG. 5.

Multilayer components of filters in accordance with the present invention may be manufactured using any well-known deposition technique, for example, a vacuum deposition technique such as evaporation or sputtering. As reflection blocking bands in the inventive filters, however, are relatively narrow it is preferably that a layer deposition technique be used which provides layers having a packing density close to unity. A preferred method is reactive ion-plating.

Providing layer density close to unity discourages variation of filter properties with time or environmental conditions. Such variation may cause a reflection blocking band to become misaligned with a wavelength to be blocked and allow for transmission of that wavelength to increase above a desired level.

The present invention has been described and depicted in terms of a preferred and other embodiments. The invention is not limited, however, to those embodiments described and depicted. Rather, the invention is limited by the claims appended hereto.

What is claimed is:

1. A filter system for reflectively blocking laser radiation having a wavelength in a green portion of the visible electromagnetic spectrum, comprising:

a plurality of layers deposited on at least one substrate, the plurality of layers including a sequence of layers of alternately high and low refractive index transparent materials, the thickness of said layers selected at least such that a continuous band of wavelengths including the wavelength of the laser radiation is reflectively blocked and other wavelengths in the visible portion of the electromagnetic spectrum are transmitted; and wherein transmission of said other wavelengths of the visible portion of the electromagnetic spectrum is controlled such that transmission in red and blue portions of the electromagnetic spectrum, starting at a predetermined characteristic wavelength in each thereof, progressively decreases with respectively increasing and decreasing wavelengths, thereby providing that the filter system has an essentially neutral transmission color.

2. The filter system of claim 1 wherein said transmission control is accomplished at least in part using a wavelength-selective absorbing filter material.

3. A filter system for reflectively blocking laser radiation having a wavelength in the visible portion of the electromagnetic spectrum, and transmitting other wavelengths in the visible portion of the electromagnetic spectrum, the visible portion of the electromagnetic spectrum defined as having red, green, and blue primary-color wavelength-regions, the filter comprising:

a plurality of layers deposited on at least one substrate, said plurality of layers including a sequence of layers of alternately high and low refractive index transparent materials;

thickness of individual layers in the plurality of layers being selected such that a continuous band of wavelengths including the wavelength of the laser radiation is reflectively blocked, the bandwidth of the continuous band of reflectively-blocked wavelengths being sufficiently narrow that at least a portion of each of the red, green, and blue primary-color wavelength-regions is transmitted; and thickness of individual layers in the plurality of layers is further selected such that said transmitted portions of the red, green, and blue primary-color wavelength-regions is arranged such that the filter system has an essentially neutral transmission color.

4. The filter system of claim 3 wherein said reflectively-blocked band of wavelengths is located in the green primary-color wavelength-region of the spectrum, and said layer thickness selection provides that transmission in the red and blue primary-color wavelength-regions, starting at a predetermined characteristic wavelength in each thereof, progressively decreases with respectively increasing and decreasing wavelengths thereby providing said essentially neutral transmission color.

5. The film system of claim 4, the invention further characterized in that the plurality of layers is deposited on two transparent substrates.

6. The filter system of claim 4 wherein said characteristic wavelengths in the red and blue primary-color wavelength-regions are respectively greater than about 580 nanometers and less than about 510 nanometers.

7. The multilayer filter system of claim 3, the invention further characterized in that said transmission color has a saturation of less than about ten percent.

8. The multilayer filter system of claim 7, wherein said transmitted portions of the red, green, and blue primary-color wavelength-regions is further selected such that the filter system has a photopic transmission efficiency greater then about fifty percent.

9. A filter system for reflectively blocking laser radiation at first and second wavelengths in the visible portion of the electromagnetic spectrum, and transmitting other wavelengths in the visible portion of the electromagnetic spectrum, the visible portion of the electromagnetic spectrum defined as having red, green, and blue primary-color wavelength-regions, the filter comprising;

a plurality of layers deposited on at least one substrate, the plurality of layers including a sequence of layers of alternately high and low refractive index transparent materials;

thickness of individual layers in the plurality of layers being selected such that first and second bands of wavelengths including respectively the first and second wavelengths of the laser radiation are reflectively blocked, said first and second bands of wavelengths being separated on a wavelength scale, the bandwidth of said first and second bands of reflectively-blocked wavelengths being sufficiently narrow that at least a portion of each of the red, green, and blue primary-color wavelength-regions is transmitted; and thickness of individual layers in the plurality of layers being selected such that the transmission of the portions of the red, green, and blue primary-color wavelength-regions is arranged such that the filter system has an essentially neutral transmission color.

10. The filter system of claim 1 wherein said transmission control is accomplished at least in part by said selection of the thickness of said layers.

11. The filter system of claim 1, wherein said characteristic wavelengths in the red and blue portions of the visible electromagnetic spectrum are respectively greater than about 580 nanometers and less than about 510 nanometers.

* * * * *